United States Patent
Crabtree

(10) Patent No.: US 7,588,234 B2
(45) Date of Patent: Sep. 15, 2009

(54) AIRSPRING SLEEVE

(75) Inventor: Michael L. Crabtree, Arvada, CO (US)

(73) Assignee: Freudenberg-NOK General Partnership, Plymouth, MI (US)

(*) Notice: Subject to any disclaimer, the term of this patent is extended or adjusted under 35 U.S.C. 154(b) by 555 days.

(21) Appl. No.: 10/627,034

(22) Filed: Jul. 24, 2003

(65) Prior Publication Data

US 2004/0041313 A1  Mar. 4, 2004

Related U.S. Application Data

(60) Provisional application No. 60/407,361, filed on Aug. 30, 2002.

(51) Int. Cl.
  *F16F 9/04* (2006.01)
(52) U.S. Cl. ............ 267/64.24; 267/64.27; 267/64.21
(58) Field of Classification Search ............. 267/64.11, 267/64.19, 64.23, 64.27, 64.21, 64.24, 122
  See application file for complete search history.

(56) References Cited

U.S. PATENT DOCUMENTS

| | | | | |
|---|---|---|---|---|
| 2,980,571 A | * | 4/1961 | Crockett Mosshart et. al. | 156/148 |
| 3,319,952 A | * | 5/1967 | Travers | 267/64.27 |
| 3,403,603 A | * | 10/1968 | Turner | 92/99 |
| 3,666,598 A | * | 5/1972 | Christie | 156/361 |
| 3,897,941 A | * | 8/1975 | Hirtreiter et al. | 267/64.24 |
| 4,741,517 A | * | 5/1988 | Warmuth et al. | 267/64.24 |
| 4,763,883 A | * | 8/1988 | Crabtree | 267/64.24 |
| 5,080,328 A | * | 1/1992 | Pees | 267/64.24 |
| 5,201,499 A | * | 4/1993 | Elliott et al. | 267/64.27 |
| 5,286,010 A | | 2/1994 | Pahl et al. | 267/64.24 |
| 5,566,929 A | | 10/1996 | Thurow | 267/64.24 |
| 5,975,506 A | | 11/1999 | Thurow et al. | 267/64.23 |

FOREIGN PATENT DOCUMENTS

| | | |
|---|---|---|
| DE | 29 05 791 | 8/1980 |
| EP | 0 285 726 | 10/1988 |
| EP | 1 164 309 A2 | 12/2001 |
| WO | WO 02/064993 A2 | 8/2002 |

* cited by examiner

*Primary Examiner*—Robert A Siconolfi
*Assistant Examiner*—Mariano Sy
(74) *Attorney, Agent, or Firm*—Ronald W. Wangerow; Harness, Dickey & Pierce, P.L.C.

(57) ABSTRACT

An air spring sleeve. The sleeve comprises an elastomer body having two plies. Each ply comprises a cord embedded in the elastomer body. Each cord is wound about the sleeve in an opposing direction from the other and each having a helix angle. The first cord helix angle and the second cord helix angle comprise a cord differential helix angle. The first or inner cord helix angle is greater than a second or outer cord helix angle. The cord differential helix angle is in the range of approximately 0° to 2.5°.

5 Claims, 2 Drawing Sheets

AIRSPRING SLEEVE

REFERENCE TO RELATED APPLICATIONS

This application claims priority from U.S. provisional application Ser. No. 60/407,361 filed Aug. 30, 2002.

FIELD OF THE INVENTION

The invention relates to an air spring and more particularly to an air spring sleeve having at least two plies, each ply having a cord differential helix angle wherein an inner cord helix angle is greater than an outer cord helix angle.

BACKGROUND OF THE INVENTION

Air springs generally comprise a piston and an endcap with an elastomer sleeve connected in an airtight manner between them. The sleeves may comprise cords embedded in the elastomer body. The cords are wound at a helix angle with respect to a sleeve centerline. The helix angle for each flexible member cord is substantially equal. Equal helix angles contribute to torsional strain and premature failure in air spring sleeves.

Composite sleeves are also known. They comprise a sleeve having a first flexible member connected in a partially overlapping manner to a second flexible member. Each flexible member having a different cord helix angle. The inner flexible member having a cord helix angle less that an outer flexible member cord helix angle with respect to a sleeve centerline.

Representative of the art is U.S. Pat. No. 5,975,506 (1999) to Thurow et al. which discloses an air spring having a composite flexible member in which cords are embedded as a reinforcement. The cord angle (a) in the first flexible-member is different from the cord angle β in the second flexible-member component. Cord angle (a) is less than cord angle β.

What is needed is an air spring sleeve having little or no torsional strain. What is needed is an air spring sleeve having a cord helix angle differential wherein the inner cord helix angle is greater than an outer cord helix angle. The present invention meets these needs.

SUMMARY OF THE INVENTION

The primary aspect of the invention is to provide an air spring sleeve having little or no torsional strain.

Another aspect of the invention is to provide an air spring sleeve having a cord helix angle differential wherein the inner cord helix angle is greater than an outer cord helix angle.

Other aspects of the invention will be pointed out or made obvious by the following description of the invention and the accompanying drawings.

The invention comprises an air spring sleeve. The sleeve comprises an elastomer body having two plies. Each ply comprises a cord embedded in the elastomer body. Each cord is wound about the sleeve in an opposing direction from the other and each having a helix angle. The first cord helix angle and the second cord helix angle comprise a cord differential helix angle. The first or inner cord helix angle is greater than a second or outer cord helix angle. The cord differential helix angle is in the range of approximately 0° to 2.5°.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
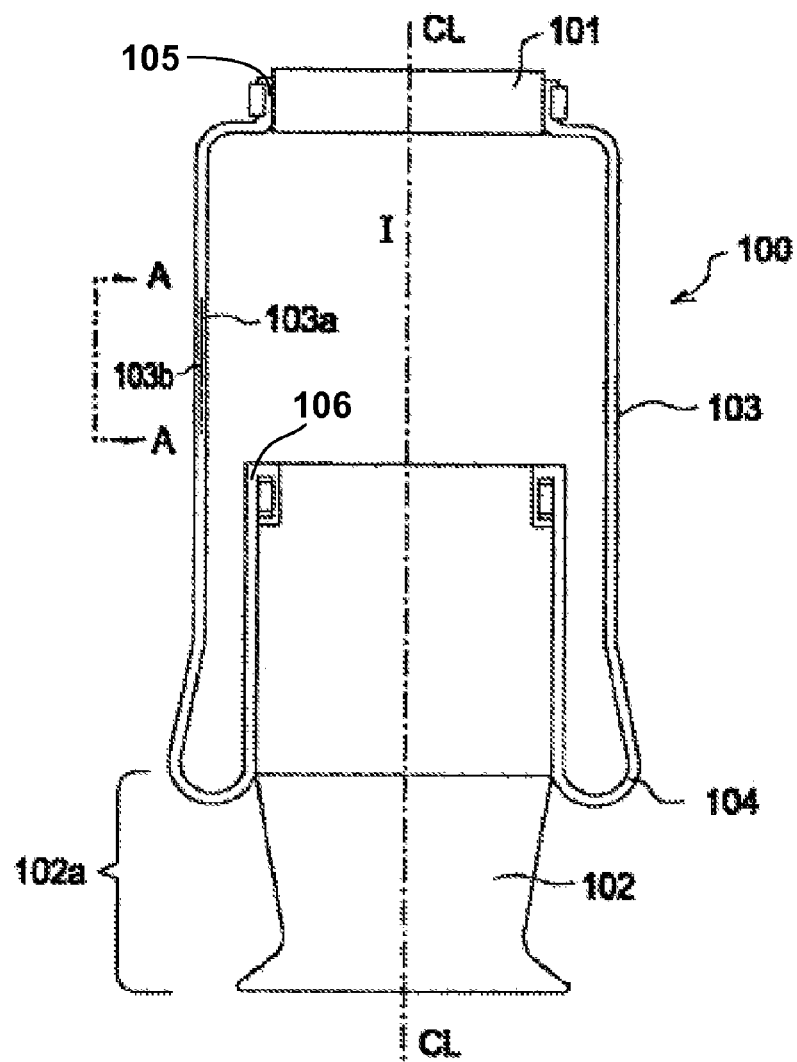
FIG. 1 is a cross-sectional view of an air spring.

FIG. 1 is a cross-sectional view of an air spring. Air spring 100 generally comprises sleeve 103. Sleeve 103 is connected at each end 105, 106 to endcap 101 and piston 102. Sleeve 103 is constructed of two plies 103a and 103b vulcanized together.

As the air spring is compressed a rolling lobe 104 is formed. The rolling lobe 104 rolls along an outer surface 102a of piston 102 as the piston moves relative to the endcap.

Figure 2:
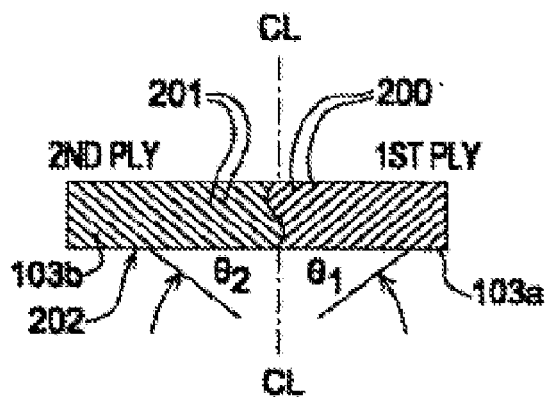
FIG. 2 is a detail of a sleeve at A-A in an uninflated state.

FIG. 2 is a detail at A-A of a sleeve in an uninflated state. Ply 103a is an inner ply disposed inward toward an airspring interior I. Ply 103b is an outer ply disposed outward of an airspring interior I as compared to ply 103a. Each ply 103a and 103b comprises a cord 200 and 201 respectively, embedded in an elastomer body and extending the length of the elastomer body from end 105 to end 106. The elastomer material may comprise a natural or synthetic rubber, or a combination thereof. Cords 200 and 201 comprise aramid having a 1000 denier. Cords 200 and 201 may also comprise nylon and polyester, as well as any other textile reinforcements known in the art, and combinations of two or more of the foregoing.

The technique of building on a mandrel generally comprises building a preform on a cylindrical mandrel having two plies of unidirectional cords wound upon an elastomer layer. The cords are spirally wound about the sleeve preform at what is referred to as a helix angle. The ply cords 200, 201 are wound in opposite wrap directions. The sleeve is then vulcanized using methods known in the art. More particularly, cords 200 and 201 describe a helix angle θ with respect to a sleeve centerline CL. Cord 200 is wound first with helix angle $\theta_1$. Cord 201 is wound over cord 200 with a helix angle $\theta_2$ in an opposite direction.

An important aspect of the quality of a vehicle ride derived from using air springs in the suspension is termed harshness. Prior art air springs have a relatively higher harshness due to a phenomenon wherein at the beginning of the compression stroke the air spring tends to momentarily rotate about a major axis, axis CL in the instant case see FIG. 1. More particularly, as the air spring is compressed the air spring will tend to rotate about the compression axis as it attempts to move axially. This tendency is most pronounced during initial application of an impulse by a vehicle suspension to the airspring. The tendency to initially rotate momentarily impedes the air spring's ability to compress axially. This initial rotation tendency manifests as a momentarily elevated spring rate, which causes an elevated resistance to axial movement resulting in a momentary inability accommodate a suspension movement or impulse. As such, this tendency contributes to the harshness of the ride. It has been found that equivalent helix angles in air spring plies cause this behavior, as well as increased torsional strain. This behavior leads to premature failure of the air spring sleeve, particularly those having aramid cords. Using plies having a helix angle differential as in the instant invention significantly reduces or eliminates such torsional strain, reduces harshness and increases operating life.

The helix angle controls the inflated diameter and length of the inflated air spring. Prior art sleeves comprise helix angles that are equal, namely, helix angle $\theta_1$ is equal to helix angle $\theta_2$. The helix angle for each ply is generally in the range of approximately 25° to 48°.

In the inventive sleeve, helix angle $\theta_2$ of ply 103b is less than helix angle $\theta_1$ of ply 103a, resulting in a helix angle differential, $\Delta\theta$, between the ply cords in the sleeve, namely:

$$\theta_2 < \theta_1$$

This relationship causes a significant reduction or elimination of a torsional strain in the sleeve, as well as a significant reduction in harshness. The torsional strain reduction is optimized when the helix angle differential is in the range of approximately 2.5° to 0°, namely:

$$\approx 2.5° \geq \Delta\theta > 0°$$

The torsional strain reduction is not realized for helix angle differentials exceeding approximately 5°.

Further, it has been observed that when the helix angle of ply 103b exceeds the helix angle of ply 103a, or;

$$\theta_2 > \theta_1$$

a torsional stress in the sleeve is significantly increased, leading to significantly increased harshness and premature failures.

Figure 3:
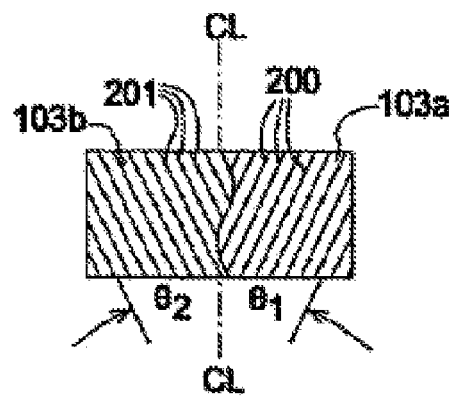
FIG. 3 is a detail of a sleeve at A-A in an inflated state.

FIG. 3 is a detail at A-A of a sleeve in an inflated state. As the air spring inflates the helix angle for the first ply and the second ply with respect to an air spring centerline will change, however the helix angle differential as described herein does not significantly change.

Figure 4:
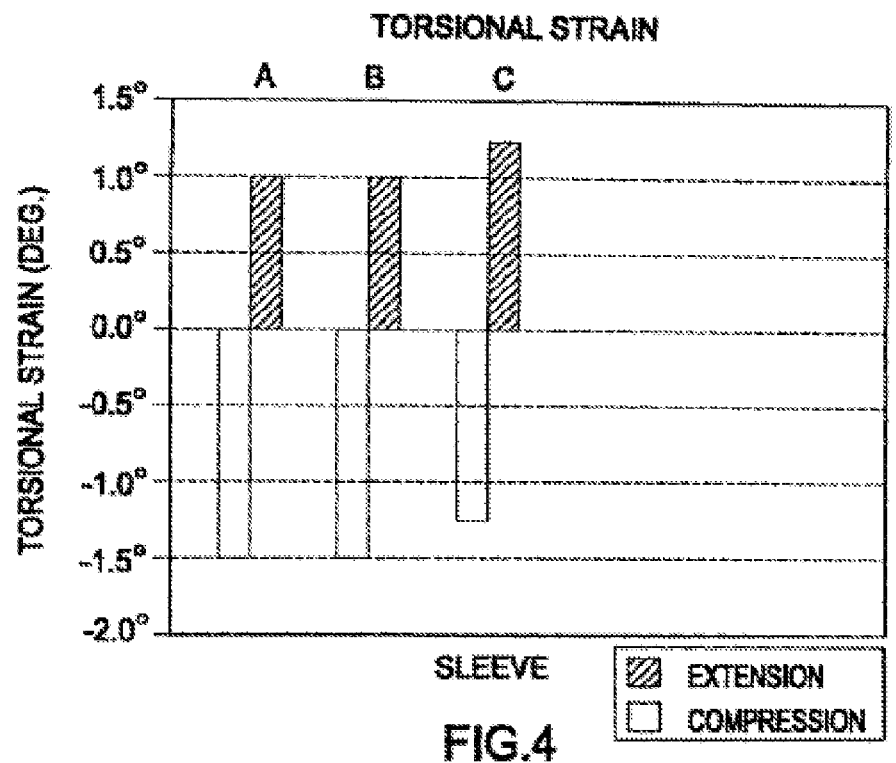
FIG. 4 is a graph depicting torsional strain in air spring sleeves having a high cord differential helix angle.

FIG. 4 is a graph depicting torsional strain in air spring sleeves having a high cord differential helix angle. Torsional strain is defined as the relative rotational motion of piston 102 as compared to endcap 101. More particularly, if during a compression or extension stroke piston 102 partially rotates about an air spring centerline CL with respect to endcap 101, such relative partial rotation between piston 102 and endcap 101 is referred to as torsional strain. For example, zero torsional strain indicates no relative partial rotation between the piston 102 and endcap 101.

FIG. 4 shows a torsional strain for exemplary sleeves A, B, and C.

The helix angle for each ply in each case is:

| Helix Angle | $\theta_1$ | $\theta_2$ | $\Delta\theta$ |
|---|---|---|---|
| A, B, C | 40° | 45° | 5° |

The differential helix angel $\Delta\theta$ for each exemplary sleeve in the graph is approximately 5°.

The negative torsional strain values are for a compression stroke and the positive torsional strain values are for an extension stroke. The stroke is approximately 75 mm in each case.

In examples A, B, and C the helix angle relationship is:

$$\theta_2 > \theta_1$$

In each of these cases the sleeve had significant torsional strain, in each case in excess of 1°.

Figure 5:
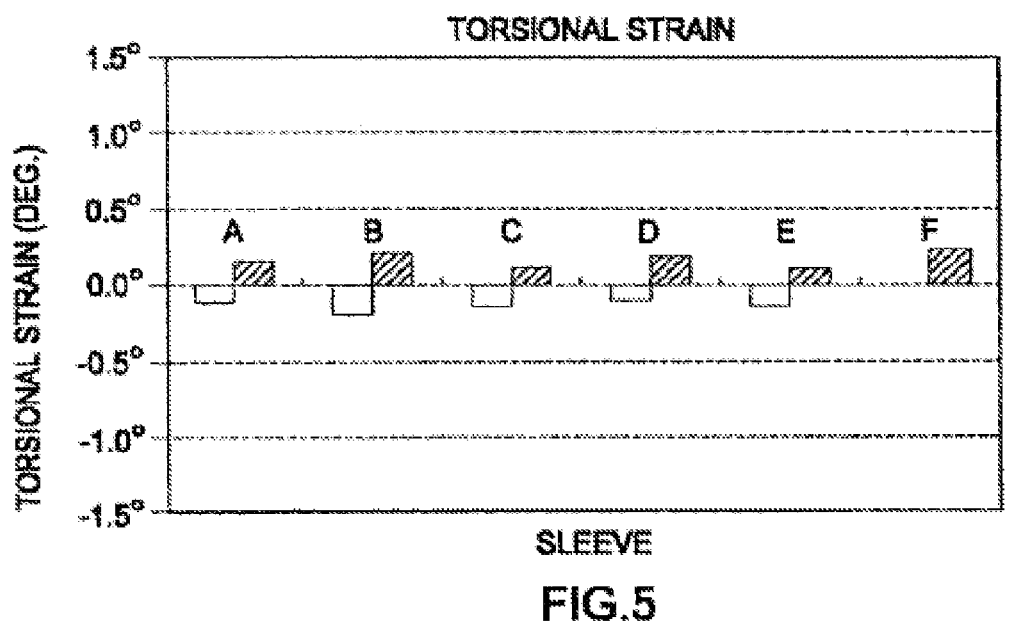
FIG. 5 is a graph depicting torsional strain in air spring sleeves having a preferred cord differential helix angle.

FIG. 5 is a graph depicting torsional strain in air spring sleeves having a preferred cord differential helix angle. Each of the exemplary cases shown in FIG. 5 has a helix angle relationship:

$$\theta_2 < \theta_1$$

The helix angle for each ply in each sleeve is:

| Helix Angle | $\theta_1$ | $\theta_2$ | $\Delta\theta$ |
|---|---|---|---|
| A, B, C, D, E, F | 41° | 39° | 2° |

The differential helix angel $\Delta\theta$ for each exemplary sleeve in the graph is approximately 2°. The negative torsional strain values are for a compression stroke and the positive torsional strain values are for an extension stroke. The stroke is approximately 75 mm in each case.

One can see in FIG. 5 that the torsional strain for each sleeve is significantly reduced, to approximately 0.15°. This represents a significant decrease in torsional strain and harshness, thereby increasing an operational life.

Although a single form of the invention has been described herein, it will be obvious to those skilled in the art that variations may be made in the construction and relation of parts without departing from the spirit and scope of the invention described herein.

I claim:

1. An air spring sleeve comprising:
   an elastomer body having first and second ends configured to be coupled to first and second structures;
   a first cord embedded in the elastomer body, the first cord wound with a first helix angle with respect to a sleeve centerline and extending from said first end to said second end;
   a second cord embedded in the elastomer body, the second cord wound with a second helix angle with respect to a sleeve centerline and extending from said first end to said second end;
   the first helix angle and the second helix angle describe a differential helix angle;
   the first cord is disposed radially inward of the second cord; and
   the first helix angle is greater than the second helix angle.

2. The air spring as in claim 1, wherein the differential helix angle is in the range of approximately 0° to 5°.

3. The air spring as in claim 2, wherein the differential helix angle is in the range of approximately 0° to 2.5°.

4. The air spring as in claim 1, wherein the first cord has a structure similar to the structure of the second cord.

5. The air spring of claim 1, wherein said first and second cords are made from a material selected from a group consisting of aramid, nylon, polyester, textiles or combinations thereof.

* * * * *